United States Patent
Lee et al.

(10) Patent No.: US 11,588,844 B1
(45) Date of Patent: Feb. 21, 2023

(54) DISTRIBUTING SEARCH LOADS TO OPTIMIZE SECURITY EVENT PROCESSING

(71) Applicant: Rapid7, Inc., Boston, MA (US)

(72) Inventors: Austin Lee, Burbank, CA (US); Gerardo Perez, Torrance, CA (US)

(73) Assignee: Rapid7, Inc., Boston, MA (US)

( * ) Notice: Subject to any disclaimer, the term of this patent is extended or adjusted under 35 U.S.C. 154(b) by 571 days.

(21) Appl. No.: 16/454,617

(22) Filed: Jun. 27, 2019

(51) Int. Cl.
*G06F 16/84* (2019.01)
*G06F 16/835* (2019.01)
*H04L 67/1097* (2022.01)
*H04L 9/40* (2022.01)
*G06F 21/62* (2013.01)

(52) U.S. Cl.
CPC ...... *H04L 63/1433* (2013.01); *G06F 16/8373* (2019.01); *G06F 16/86* (2019.01); *G06F 16/88* (2019.01); *G06F 21/62* (2013.01); *H04L 67/1097* (2013.01); *G06F 2221/21* (2013.01)

(58) Field of Classification Search
CPC ........... H04L 63/1433; H04L 29/08549; H04L 67/1097; G06F 16/8373; G06F 16/86; G06F 16/88; G06F 21/62; G06F 2221/21
See application file for complete search history.

(56) References Cited

U.S. PATENT DOCUMENTS

| | | | |
|---|---|---|---|
| 10,250,623 B1 * | 4/2019 | Patton | H04L 63/1425 |
| 11,017,764 B1 * | 5/2021 | Das | G06F 16/24578 |
| 2015/0012383 A1 * | 1/2015 | Touboul | G06Q 30/0609 705/26.35 |
| 2018/0218079 A1 * | 8/2018 | Li | G06F 40/289 |
| 2020/0184090 A1 * | 6/2020 | Grand | G06F 16/33 |
| 2020/0364220 A1 * | 11/2020 | Kamath | G06F 16/284 |

\* cited by examiner

*Primary Examiner* — Farid Homayounmehr
*Assistant Examiner* — Suman Debnath
(74) *Attorney, Agent, or Firm* — Ashwin Anand

(57) ABSTRACT

Disclosed herein are methods, systems, and processes to distribute and disperse search loads to optimize security event processing in cybersecurity computing environments. A search request that includes a domain specific language (DSL) query directed to a centralized search cluster by an event processing application is intercepted. The event processing application is inhibited from issuing the search request to the centralized search cluster if a structured or semi-structured document matches the DSL query.

20 Claims, 9 Drawing Sheets

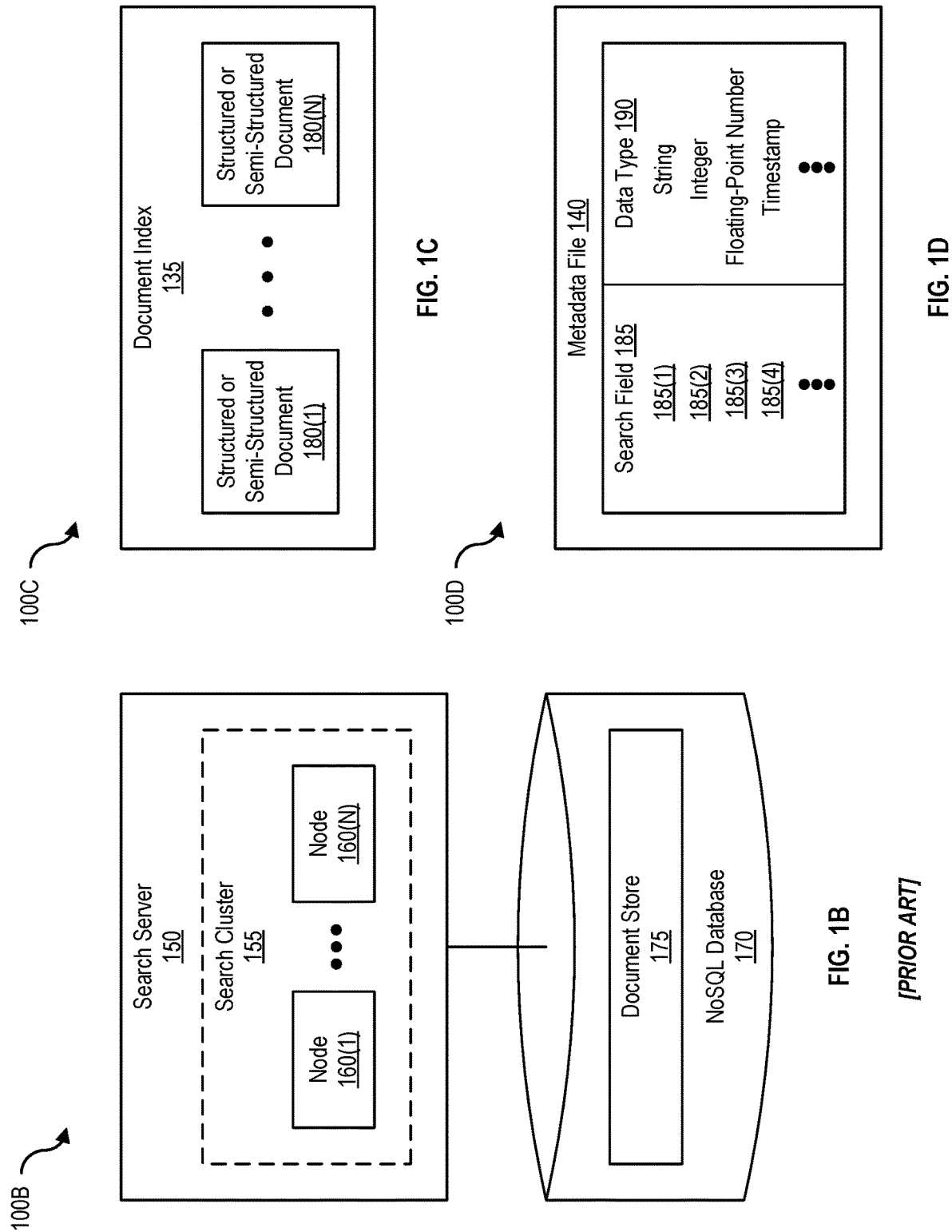

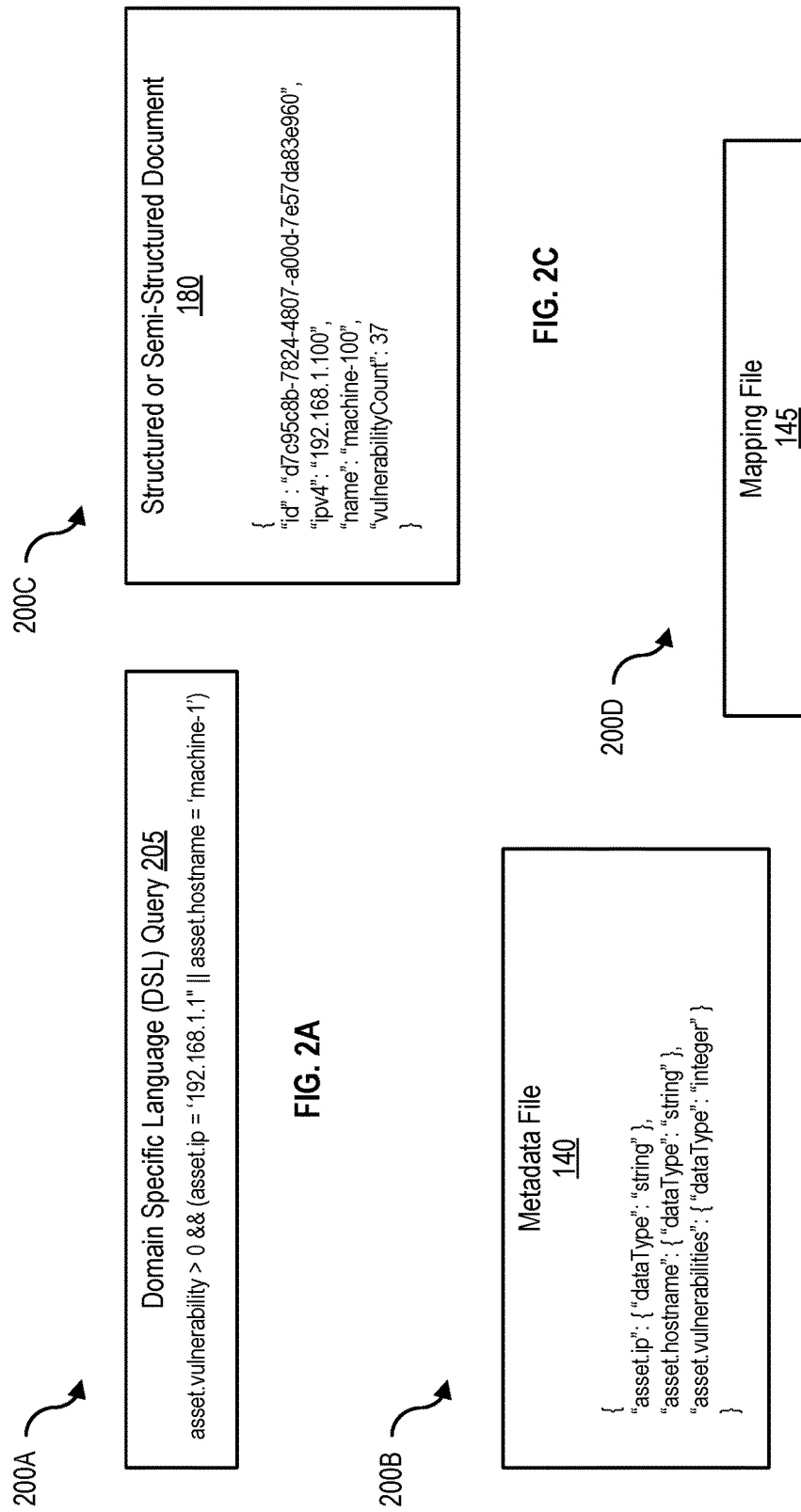

US 11,588,844 B1

DISTRIBUTING SEARCH LOADS TO OPTIMIZE SECURITY EVENT PROCESSING

BACKGROUND

Field of the Disclosure

This disclosure is related to cybersecurity computing systems. In particular, this disclosure is related to distributing search loads to optimize security event processing.

Description of the Related Art

Representational State Transfer (REST) is a software architectural style that defines a set of constraints that can be used to create web services. By using a uniform and pre-defined set of stateless operations, RESTful web services permit interoperability between computing systems on the Internet. For example, Elasticsearch®, among others, combines a distributed RESTful search and analytics engine with a NoSQL database (e.g., a non-Structured Query Language database that is modeled in means other than tabular relations used in relational databases).

Modern storage and search computing architectures based on such NoSQL databases and multitenant-capable full-text search engines with Hypertext Transfer Protocol (HTTP) web interfaces and schema-free structured or semi-structured documents (e.g., an open-standard file format like JavaScript Object Notation (JSON) for asynchronous browser-server communication that uses human-readable text to transmit data objects consisting of attribute-value pairs and array data types) permit the efficient storing and searching of vast amounts of data for various use cases (e.g., big data, real-time web applications, and the like).

In complex cybersecurity computing environments, modern distributed search paradigms like Elasticsearch®, among others, are implemented to permit the processing and searching of security events. Unfortunately, given the vast number of potentially malicious security events in such cybersecurity computing environments that require processing for analysis, relying solely on technology stacks like Elasticsearch® is not only computationally expensive, but also does not readily facilitate the scalability of event processing applications.

SUMMARY OF THE DISCLOSURE

Disclosed herein are methods, systems, and processes for distributing search loads to optimize security event processing. One such method involves intercepting a search request that includes a domain specific language (DSL) query directed to a distributed search cluster by an event processing application, determining that a structured or semi-structured document matches the DSL query in the search request, and inhibiting the event processing application from issuing the search request to the distributed search cluster.

In one embodiment, the method involves receiving an input identifying one or more events applicable to a task to be performed by execution of the search request that includes the DSL query. In this example, the DSL query includes one or more comparison statements, each comparison statement includes a search field, a comparison operator, and values, and a list of search fields and expected data types is maintained in a metadata file.

In another embodiment, the method involves generating a mapping file by mapping the search fields to keys in the structured or semi-structured document. In this example, and as a result of the mapping, the keys represent the search fields in the DSL query and the values represent the keys in the structured or semi-structured document.

In some embodiments, the method involves parsing the DSL query into comparison statements, and for each comparison statement, accessing the mapping file, identifying a key in the structured or semi-structured document utilizing a search field, parsing the structured or semi-structured document, extracting an associated value of the key utilizing the key in the structured or semi-structured document, and parsing the value or converting the value to an expected data type indicated in the metadata file.

In other embodiments, the method involves comparing the associated value with a value specified in the DSL query and determining whether the structured or semi-structured document matches the DSL query. In these examples, the method further involves determining whether the DSL query includes comparison statements and repeating the comparison process for each comparison statement (e.g., by determining whether a structured or semi-structured document matches a DSL query) if the DSL query includes the comparison statements.

In certain embodiments, the search request is intercepted at a security server, the search request includes a hypertext transfer protocol (HTTP) request, the distributed search cluster is implemented by a search server, the structured or semi-structured document is a JavaScript Object Notation (JSON) document, the JSON document is created by the event processing application upon occurrence of an event, and the event identifies a security vulnerability associated with a computing device communicatively coupled to the security server.

The foregoing is a summary and thus contains, by necessity, simplifications, generalizations and omissions of detail; consequently those skilled in the art will appreciate that the summary is illustrative only and is not intended to be in any way limiting. Other aspects, features, and advantages of the present disclosure, as defined solely by the claims, will become apparent in the non-limiting detailed description set forth below.

BRIEF DESCRIPTION OF THE DRAWINGS

This disclosure may be better understood, and its objects, features, and advantages made apparent to those skilled in the art by referencing these drawings and/or figures.

FIG. 1B [prior art] is a block diagram 100B of a search server that implements a distributed search cluster, according to one embodiment of the present disclosure.

FIG. 1C is a block diagram 100C of a document index, according to one embodiment of the present disclosure.

FIG. 1D is a block diagram 100D of a metadata file, according to one embodiment of the present disclosure.

FIG. 2A is a block diagram 200A of a domain specific language (DSL) query, according to one embodiment of the present disclosure.

FIG. 2B is a block diagram 200B of a metadata file, according to one embodiment of the present disclosure.

FIG. 2C is a block diagram 200C of a structured or semi-structured document, according to one embodiment of the present disclosure.

FIG. 2D is a block diagram 200D of a mapping file, according to one embodiment of the present disclosure.

Figure 1A:
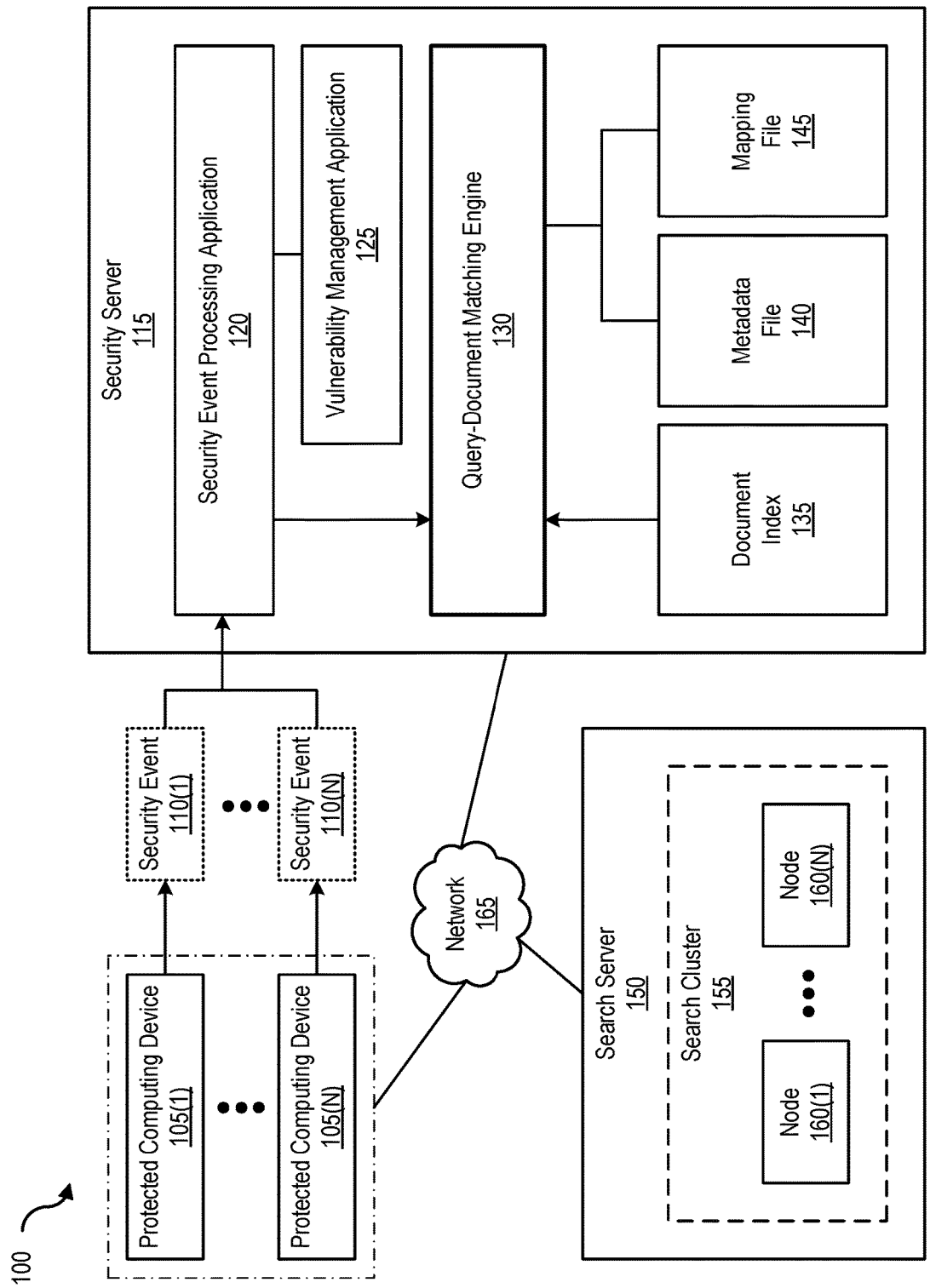
FIG. 1A is a block diagram 100A of a security server that processes security events, according to one embodiment of the present disclosure.

While the disclosure is susceptible to various modifications and alternative forms, specific embodiments of the disclosure are provided as examples in the drawings and detailed description. It should be understood that the drawings and detailed description are not intended to limit the disclosure to the particular form disclosed. Instead, the intention is to cover all modifications, equivalents and alternatives falling within the spirit and scope of the disclosure as defined by the appended claims.

DETAILED DESCRIPTION

Introduction

In modern cybersecurity computing environments, solutions and/or security operations that include vulnerability management (VM), incident detection and response (IDR), and the like, are typically facilitated by a complex combination of software (and hardware) components, implemented both on-premise and/or in the cloud. Because computing systems implemented for the purposes of cybersecurity typically monitor events related to security (e.g., suspicious logins, abnormal network behavior, atypical file access patterns, unusual protected host activity, and the like), modern cybersecurity computing systems often employ dedicated event processing applications to receive and process security-based events for subsequent analysis (e.g., to determine whether a given vulnerability should be patched, whether a given protected host should be taken offline, and the like).

Event processing applications typically evaluate or analyze security events by matching such security events against user-defined automated tasks. For example, a security event such as a protected host logging in from an unfamiliar geographical location can be flagged for subsequent security-based evaluation by matching this security event against a user-defined automated task that requests a list of protected hosts not logging in from the company headquarters (e.g., based on an Internet Protocol (IP) address of the protected host during login). In a typical cybersecurity computing environment, hundreds and thousands of such security events associated with (and triggered by) the IP addresses, hostnames, vulnerability counts, and the like, of hundreds and thousands of protected hosts require computationally expensive processing for subsequent security-based evaluation or analysis.

The foregoing user-defined automated tasks include a query declaring the scope of relevant security events that can trigger a given automated task. The event processing application then matches the given automated task if the security event's unique identifier is within the query's search results. Typically, such a search is executed on a separate application (e.g., Elasticsearch® or other comparable distributed search methodologies based on RESTful web services, NoSQL databases, and structured or semi-structured schema-free documents (e.g., JSON)). As noted, separately executing hundreds of thousands of such searches is undesirable and wasteful.

One drawback (among many) with the existing technology paradigm for security event processing is the inability to effectively scale the event processing application. Because the event processing application is encumbered with processing a significant number of security events (e.g., by pushing and executing those searches on a separate application), even a purportedly "fast" search methodology like the one provided by Elasticsearch® adds an unacceptable amount of time between security event occurrence, security event processing, and security event analysis. Unfortunately, in time-sensitive cybersecurity computing environments, such a delay is not only intolerable but can also be dangerous given the harm that can be caused by malicious actors such as hackers (e.g., due to a delay in vulnerability patching, and the like).

Another shortcoming (among many) with outsourcing such event-to-task matching operations to an extraneous application is that an immediate qualitative analysis of a given (time-sensitive) security event or a group of security events cannot be readily performed at the source. For example, under existing search methodologies in the event processing context (as discussed above), searches are typically aggregated and forwarded to a separate search application for processing. Unfortunately, this additional step is not only redundant and wasteful (e.g., from a network bandwidth utilization perspective), but also effectively forecloses a bifurcated event processing approach (e.g., processing important security events right away and forwarding non-important security events to the extraneous search application).

Disclosed herein are methods, systems, and processes for distributing search loads to optimize security event processing by at least matching contents of structured or semi-structured documents against search queries formulated in a custom domain-specific language.

Example Load-Distributed Security Event Processing System

FIG. 1A is a block diagram 100A of a security server 115 that processes security events for subsequent evaluation and analysis, according to one embodiment. The load-distributed security event processing system of FIG. 1A includes at least protected computing devices 105(1)-(N), security server 115, and optionally, a search server 150. Protected computing devices 105(1)-(N), security server 115, and/or search server 150 can be any type of physical or virtual computing devices (e.g., laptops, desktops, virtual machines, and the like) and are interconnected via network 165, which can be any type of network or interconnection.

In one embodiment, protected computing devices 105(1)-(N) generate security events 110(1)-(N). Security events 110(1)-(N) (or more generally "event(s)") include any computing action or operation performed by or applicable to protected computing devices 105(1)-(N) that can be indicative of a cybersecurity risk (e.g., information indicating that a computing asset has changed in some manner—login information including time, location, and the like, network behavior information associated with protected computing devices 105(1)-(N), user behavior information associated with protected computing devices 105(1)-(N), file or file system access patterns, and the like). In this example, such security events are responsive (or unresponsive) to search queries (e.g., based on IP addresses, hostnames, vulnerability counts, and the like) that are part of user-defined automated tasks.

Security events 110(1)-(N) are received by security server 115. Security server 115 includes at least a security event processing application 120, a vulnerability management application 125, a query-document matching engine 130, a document index 135, a metadata file 140, and a mapping file 145. Search server 150 includes a search cluster 155 with nodes 160(1)-(N) (e.g., a distributed search cluster). In one embodiment, query-document matching engine 130 matches contents of structured or semi-structured schema-free documents against (custom) domain-specific language (DSL) queries.

FIG. 1B [prior art] is a block diagram 100B of a search server that implements a distributed search cluster, according to one embodiment. As noted, search server 150 includes search cluster 155 with nodes 160(1)-(N) (for distributed searching) and is communicatively coupled to a NoSQL database 170 with a document store 175. Although modern storage and search computing architectures based on such NoSQL databases (and multitenant-capable full-text search engines with HTTP interfaces and schema-free JSON documents) can facilitate the searching of vast of data to perform query-document matching, as noted above, this additional step of executing searches on a separate application can be redundant, wasteful, and sub-optimal in cybersecurity computing environments. Therefore, in existing event processing implementations, and as shown in FIG. 1B, security event processing application 120 merely acts as an (intermediate) event clearing mechanism for security events and security server 115 is prevented from utilizing a scalable security event processing application 120 that can evaluate security events associated with a specific asset (e.g., a specific protected computing device).

More importantly, given the voluminous nature of security events and asset state changes in modern computing environments (e.g., software programs appearing on a given asset, open port(s), vulnerabilities of certain severities, vulnerabilities that match a Common Vulnerabilities and Exposures (CVE) list, and the like), customers of cybersecurity solutions demand high-value actionable notifications, for example, about a specific type of (state) change of a protected asset (e.g., protected computing device 105(1)) that is relevant to that particular customer. Considering that security event processing application 120 typically receives a (particular) security event (e.g., security event 110(1)) about a specific asset (e.g., protected computing device 105(1)), searching across thousands (if not millions) of assets in an extraneous document store (e.g., document store 175) using search cluster 155 is computationally inefficient, and resource intensive. Therefore, in one embodiment, instead of performing a search using search server 150 of FIG. 1B, query-document matching engine 130 translates a query-like syntax to match a structured or semi-structured document associated with a given security event.

Example of Distributing Search Loads to Optimize Security Event Processing

In one embodiment, security query-document matching engine 130 intercepts a search request that includes a DSL query directed to search cluster 155 (e.g., a distributed search cluster) by security event processing application 120. Query-document matching engine 130 determines that a structured or semi-structured document (e.g., a JSON document, an eXtensible Markup Language (XML) document, and the like), matches the DSL query in the search request. Query-document matching engine 130 then inhibits (or prevents) security event processing application 120 from issuing the search request to search cluster 155.

FIG. 1C is a block diagram 100C of a document index, according to one embodiment. Document index 135 includes structured or semi-structured documents 180(1)-(N). In existing implementations, structured or semi-structured documents 180(1)-(N) are typically maintained by search server 150 in document store 175 of NoSQL database 170 for searching by (or to make available for searching to) search cluster 155. However, in this example, document index 135 with structured or semi-structured documents 180(1)-(N) is maintained by security server 115 for utilization by query-document matching engine 130 (as shown in FIG. 1A) and includes a subset of data available for search from document store 175 (e.g., the distributed search cluster).

Therefore, in certain embodiments, because structured or semi-structured documents 180(1)-(N) only include a subset of data of the (total amount of) data that is available in document store 175 (e.g., for expansive searching), if a determination is made by query-document matching engine 130 that a user-defined query (e.g., the DSL query) only queries (or requests) data available in structured or semi-structured documents 180(1)-(N), query-document matching engine 130 matches the query against contents of structured or semi-structured documents 180(1)-(N) and avoids searching or querying document store 175. However, if a user-defined query requests data that is not available in structured or semi-structured documents 180(1)-(N), query-document matching engine 130 instructs security event processing application 120 to forward the query to search cluster 155 (e.g., for searching within document store 175).

In some embodiments, query-document matching engine 130 receives an input identifying events (e.g., security events 110(1)-(N), events that identify vulnerabilities associated with protected computing devices 105(1)-(N), and the like) applicable to a task to be performed by execution of the search request (e.g., a HTTP request) that includes the DSL query. In this example, the DSL query is formulated using a domain specific language (e.g., languages, or often, declared syntaxes or grammars) that is specialized to a particular application domain (e.g., in this case, to security event processing in cybersecurity computing environments). The DSL query includes comparison statements, each with a search field, a comparison operator, and one or more values. A list of search fields and expected data types is maintained in a metadata file.

FIG. 1D is a block diagram 100D of a metadata file, according to one embodiment. Metadata file 140 includes search field 185 (e.g., search fields 185(1)-(N)) and data type 190. Data type 190 can include a string, an integer, a floating-point number, or a timestamp. In one embodiment, query-document matching engine 130 generates a mapping file by mapping the search fields (in the DSL query) to keys in a given structured or semi-structured document. In this example, and a result of the mapping, the keys (in a given JSON document) represent the search fields (in the DSL query), and the value (in the DSL query) represent the keys (in the given JSON document). Therefore, by mapping search fields in a DSL query to keys in a JSON document, query-document matching engine 130 can determine whether the JSON document matches a user-defined query without relying on search cluster 155 by parsing each statement (in the DSL query) and comparing each statement against contents of the JSON document.

In certain embodiments, query-document matching engine 130 parses a DSL query (which is in a specific or defined syntax or grammar) into comparison statements, and for each comparison: (1) accesses mapping file 145, (2) identifies a key in the JSON document (which is created as a result of the occurrence of a security event) utilizing a search field (in the DSL query), (3) parses the JSON document, (4) extracts an associated value of the key utilizing the key in the JSON document, and (5) parses the value, or converts the value to an expected data type indicated in metadata file 140.

In one embodiment, query-document matching engine 130 compares the associated value with the value specified in the DSL query and determines whether the JSON document matches the DSL query. In this example, query-document matching engine 130 further determines whether the DSL query includes comparison statements and repeats the foregoing comparison process for each comparison statement if the DSL query includes comparison statements (e.g., by determining whether a JSON document matches a DSL query by mapping pre-defined or user-defined grammar and pre-existing (search) fields in the JSON document).

The DSL query received by security server 115 provides a defined grammar (e.g., user-defined) that identifies the limits of the search that can be performed by query-document matching engine 130. Therefore, in some embodiments, query-document matching engine 130 maps certain (search) fields in the grammar to a specific path in a JSON document. Because a JSON document provides a hierarchical key/value mapping structure, mapping file 145 indicates a correlation between a given search field in the DSL query and a given path in the JSON document. From this correlation, query-document matching engine 130 extracts a value, parses the value, and performs an evaluation to see if there is match between the DSL query and the JSON document.

Therefore, by mapping pre-defined user grammar in a DSL query and pre-existing fields in a JSON document, and by supporting data conversions (e.g., converting text to a date or a number so that a value can be parsed as a number for numerical operations) query-document matching engine 130 can determine whether a condition entered by a user (e.g., a port number that must be exactly "22" AND a given vulnerability that matches a given CVE) can be answered in response to the DSL query by simply comparing the DSL query to the JSON document created upon occurrence of a security event, without having to encumber search cluster 155.

Example of Defining Domain Specific Language (DSL) Grammar to Search

FIG. 2A is a block diagram 200A of a DSL query 205, according to one embodiment. A user can specify which security events are applicable for an automated task using a DSL query and may want to trigger an email notification when vulnerabilities are detected on a specific computing device using a query like DSL query 205 shown in FIG. 2A. DSL query 205 includes one or more comparison statements. A comparison statement includes at least three elements: a search field, a comparison operator, and one or more values. The comparison statement results in a true or false value. For example, the statement asset.hostname='machine-1' as shown in FIG. 2A should result in either a true or false result when evaluating the statement against a structured or semi-structured document (e.g., a JSON document). Boolean operators && and || as shown in FIG. 2A are used to combine multiple search statements to compose a complex Boolean expression. Search fields like asset.ip as shown in FIG. 2A are supported for a user to enter and each (search) field is a specific data type.

As noted, examples of data types include, but are not limited to, strings, integers, floating-point numbers, timestamps, and the like. Each data type supports comparison operators such as <, >, =, !=, BETWEEN, LIKE, STARTS WITH, REGEX, and the like. Comparison operators may be applicable to certain data types. For example, a numeric field supports the <operator, but not the REGEX operator. A list of search fields is recorded, stored, and/or maintained in metadata file 140. FIG. 2B is a block diagram 200B of a metadata file, according to one embodiment. Metadata file 140 is in JSON format and declares each search field along with metadata about the field (e.g., asset.ip with a string data type, asset.hostname with a string datatype, and asset.vulnerabilities with an integer data type).

Example of Applying Search DSL Grammar to JSON Documents

FIG. 2C is a block diagram 200C of a structured or semi-structured document and FIG. 2D is a block diagram 200D of a mapping file, according to some embodiments. Once the search DSL grammar is defined, query-document matching engine 130 maps (search) fields to keys in structured or semi-structured document 180. FIG. 2C illustrates a JSON document that includes key-value pairs where each key is a string. Query-document matching engine 130 maps the keys for the JSON document to search fields as shown in FIG. 2D.

In the above example, the keys in the mapping represent search fields from the DSL grammar while the value represents keys in the JSON document. As a result, the mapping between the search field and the JSON (document) keys permits the JSON document(s) to conform to a schema-like structure. Consequently, a service that (currently) processes (security) events (e.g., security even processing application 120) is the only service that has to contend with processing such events to determine a match (thus significantly reducing (or even eliminating) the redundant and unnecessary computing load on a distributed search cluster). In addition, because events can be processed independently across multiple computing instances (that can be scaled up or down as required), dependence on a centralized search cluster (e.g., search cluster 155) as well as susceptibility to a single point of failure is avoided.

Example of Matching a JSON Document to a DSL Query

In certain embodiment, once the DSL grammar and mappings are defined, query-document matching engine 130 parses the DSL query into one or more comparison statements. For each comparison statement (e.g., asset.ip='machine-1'), the search field is used to look up the JSON document key from mapping file 145. The JSON document is parsed and the JSON key is used to extract the JSON key's associated value. Next, the value is parsed or converted to the expected data type of the search field (e.g., the expected data type is indicated in metadata file 190 that includes supported search files and their data types).

Once the value is extracted and parsed from the JSON document, the value is compared against the value specified in the DSL query. The type of comparison performed depends on the operator specified in the query. If the comparison is true, then the statement in the query is true. If the DSL query includes multiple comparison statements, the comparison process is repeated for each statement. After evaluating each statement with Boolean operators, the overall query expression results in either true or false. If the result is true, query-document matching engine 130 determines that the JSON document matches the DSL query.

Therefore, by matching JSON documents directly in security server 115, security event processing application 120 avoids issuing HTTP requests to search server 150 to determine whether a JSON document matches a user-defined query—reducing the memory and processing load on search cluster 155 and improving the overall processing time of the JSON document.

Example of Bifurcating Security Event Processing

As previously noted, depending entirely on a centralized search cluster like Elasticsearch® to evaluate each and every security event in a cybersecurity computing environment requires a significant amount of memory and processing power from the centralized search cluster and delays the processing of these events. Therefore, in one embodiment, depending on the content of the DSL query and the information that is requested for tasking, query-document matching engine 130 bifurcates event processing by categorizing or ranking each event based on an importance threshold. For example, queries that include statements associated with high value assets and/or high risk vulnerabilities are processed by query-document matching engine 130 in security server 115 where as queries that include statements associated with low value assets and/or low risk vulnerabilities are processed by search cluster 155 in search server 150.

Example Processes to Disperse Search Loads to Optimize Event Analysis

Figure 3:
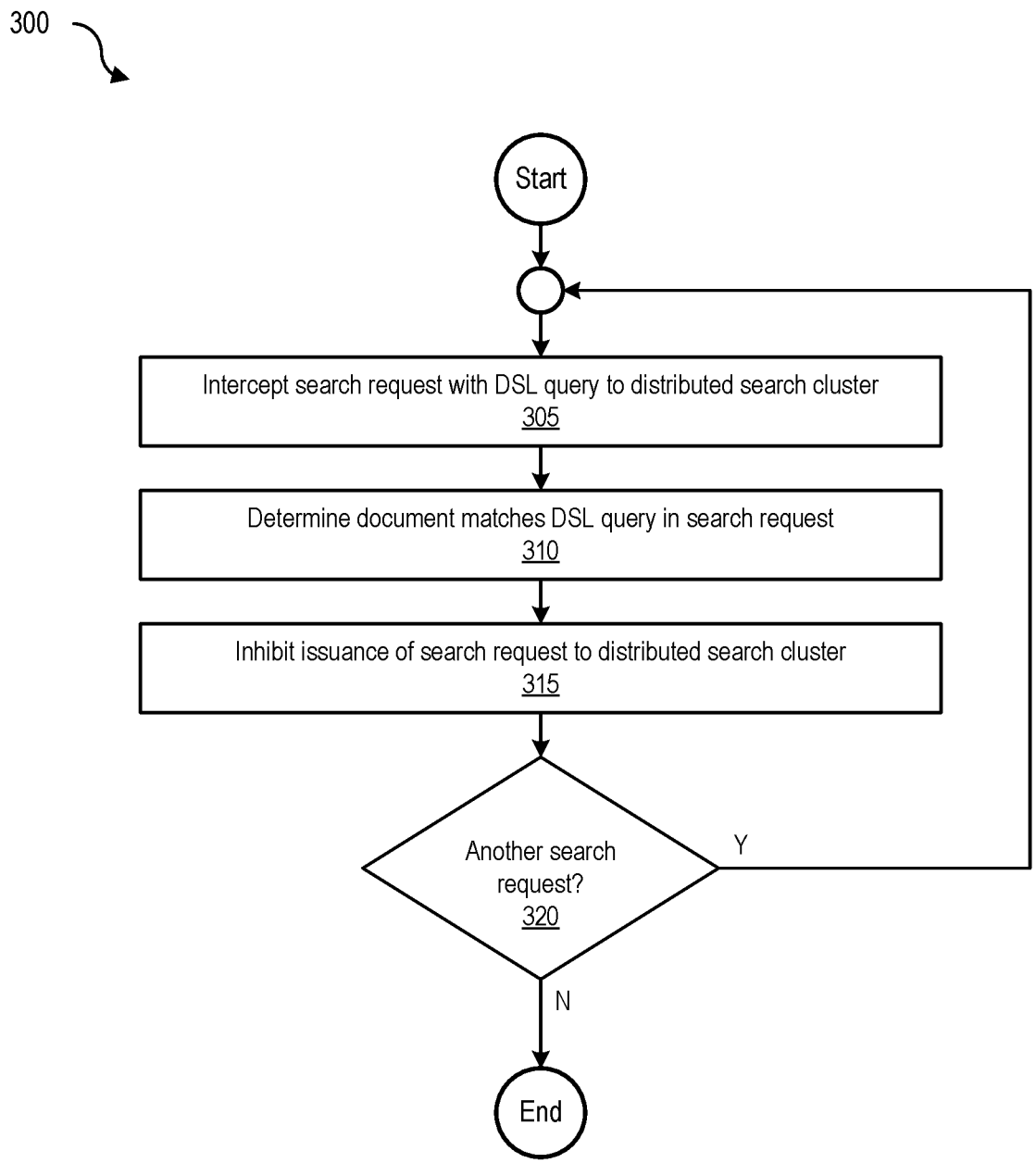
FIG. 3 is a flowchart 300 of a process to inhibit search requests to a distributed search cluster, according to one embodiment of the present disclosure.

FIG. 3 is a flowchart 300 of a process to inhibit (or prevent or block) search requests to a distributed search cluster, according to one embodiment. The process begins at 305 by intercepting a search request with a DSL query (directed) to a distributed (and centralized) search cluster (e.g., search cluster 155). At 310, the process determines that a document (e.g., structured or semi-structured document 180 that has a predicable and a reasonable expectation of structure) matches the DSL query in the search request. At 315, the process inhibits issuance of the search request (e.g., by security event processing application 120) to the distributed search cluster. At 320, the process determines if there is another search request. If there is another search request, the process loops to 305. Otherwise, the process ends.

Figure 4:
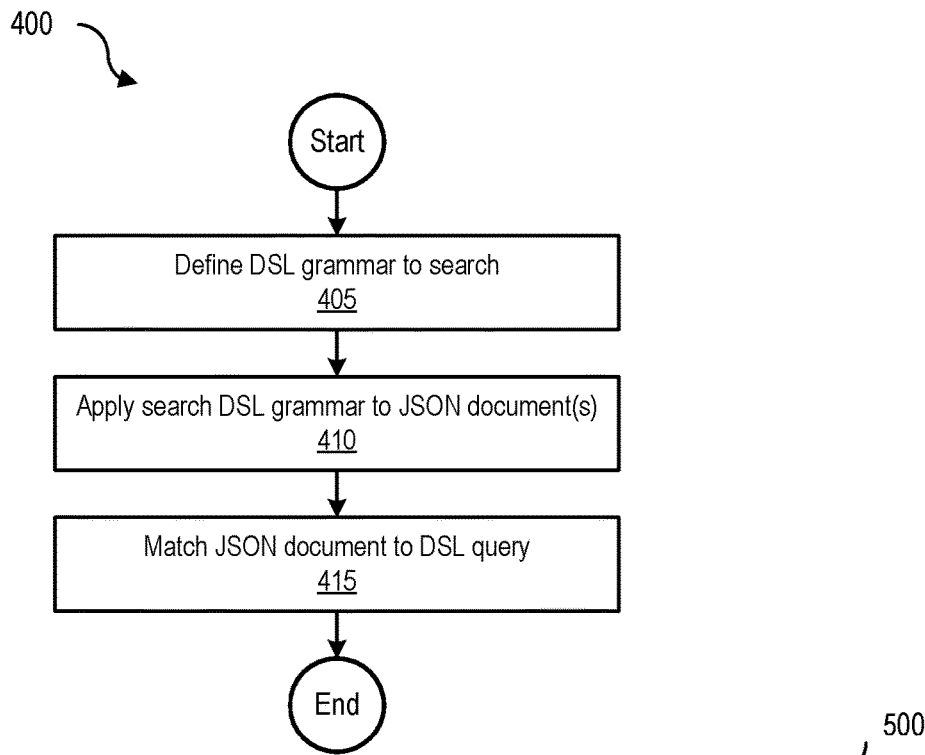
FIG. 4 is a flowchart 400 of a process to match JavaScript Object Notation (JSON) documents to a DSL query, according to one embodiment of the present disclosure.

FIG. 4 is a flowchart 400 of a process to match JavaScript Object Notation (JSON) documents to a DSL query, according to one embodiment. The process begins at 405 by defining DSL grammar to search (e.g., specifying which events are applicable to an automated task using a DSL query as shown in FIG. 2A). At 410, the process applies the search DSL grammar to JSON document(s) (e.g., performing mapping to permit schema-free JSON documents to conform to a schema-like structure as shown in FIGS. 2C and 2D). The process ends at 415 by matching the JSON document to the DSL query (e.g., parsing the DSL query, extracting an associated value, and performing statement comparison).

Figure 5:
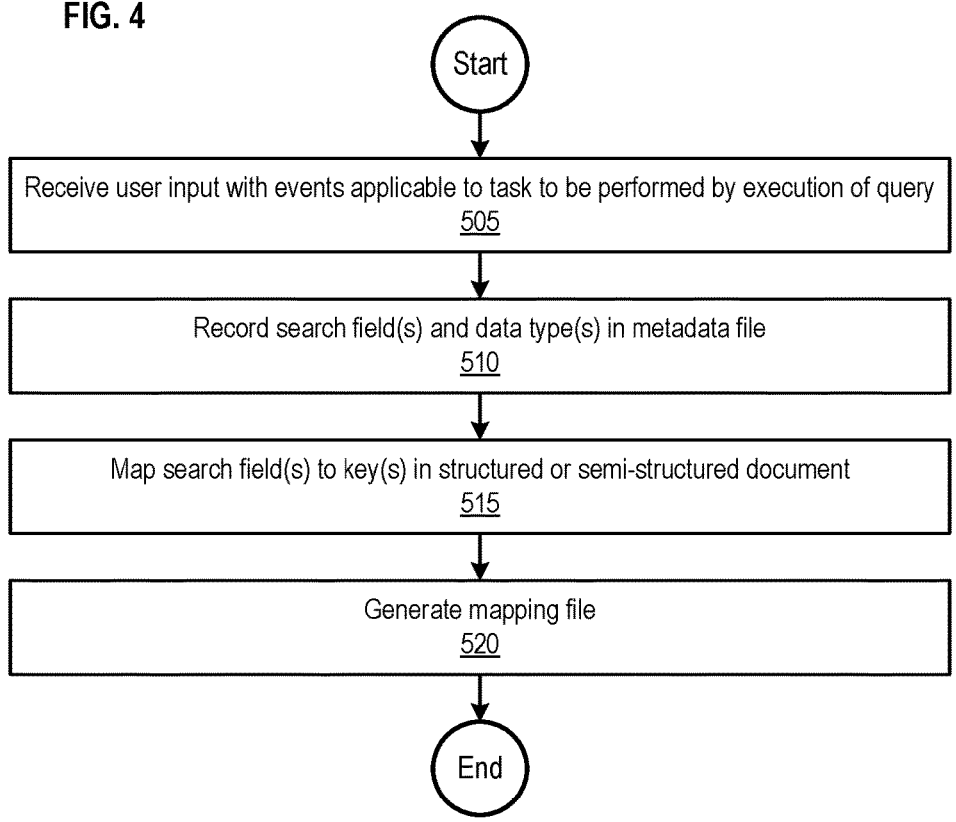
FIG. 5 is a flowchart 500 of a process to generate a mapping file, according to one embodiment of the present disclosure.

FIG. 5 is a flowchart 500 of a process to generate a mapping file, according to one embodiment. The process begins at 505 by receiving user input with events (e.g., security events 110(1)-(N)) applicable to a task to be performed by execution of a query (e.g., DSL query 205 as shown in FIG. 2A). At 510, the process records search field(s) and data type(s) in metadata file 140 (as shown in FIGS. 1D and 2B). At 515, the process maps search field(s) to key(s) in a structured or semi-structured document (as shown in FIG. 2C), and ends at 520 by generating mapping file 145 (as shown in FIG. 2D).

Figure 6:
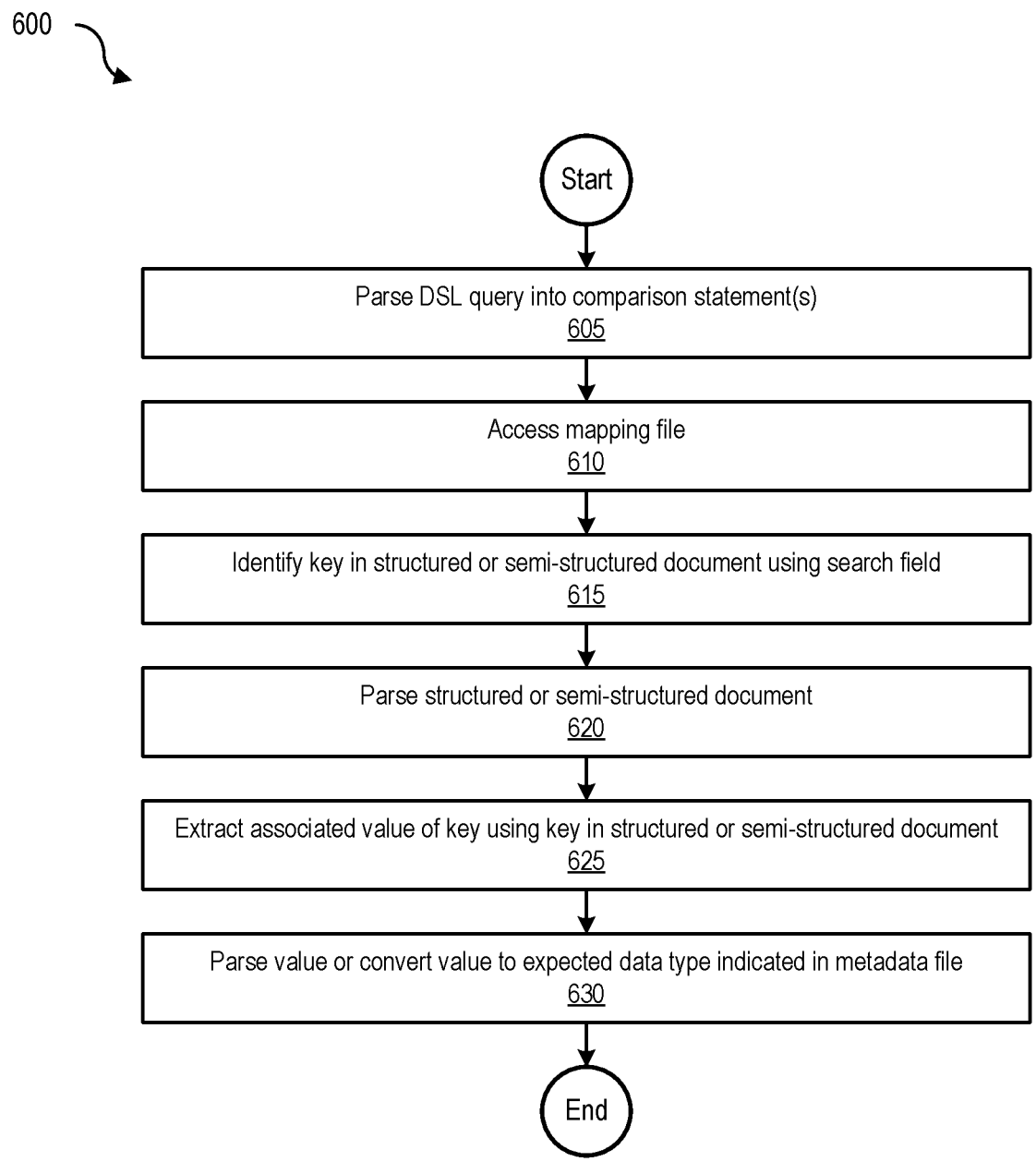
FIG. 6 is a flowchart 600 of a process to parse a DSL query using a structured or semi-structured document, according to one embodiment of the present disclosure.

FIG. 6 is a flowchart 600 of a process to parse a DSL query using a structured or semi-structured document, according to one embodiment. The process begins at 605 by parsing a DSL query into comparison statements, and at 610, accesses mapping file 145. At 615, the process identifies a key in a structured or semi-structured document (e.g., from a key-value pair) using a search field, and at 620, parses the structured or semi-structured document. At 625, the process extracts an associated value of the key (identified) in the structured or semi-structured document, and ends at 630 by parsing the (associated) value (or converting the value to an expected data type indicated in metadata file 140).

Figure 7:
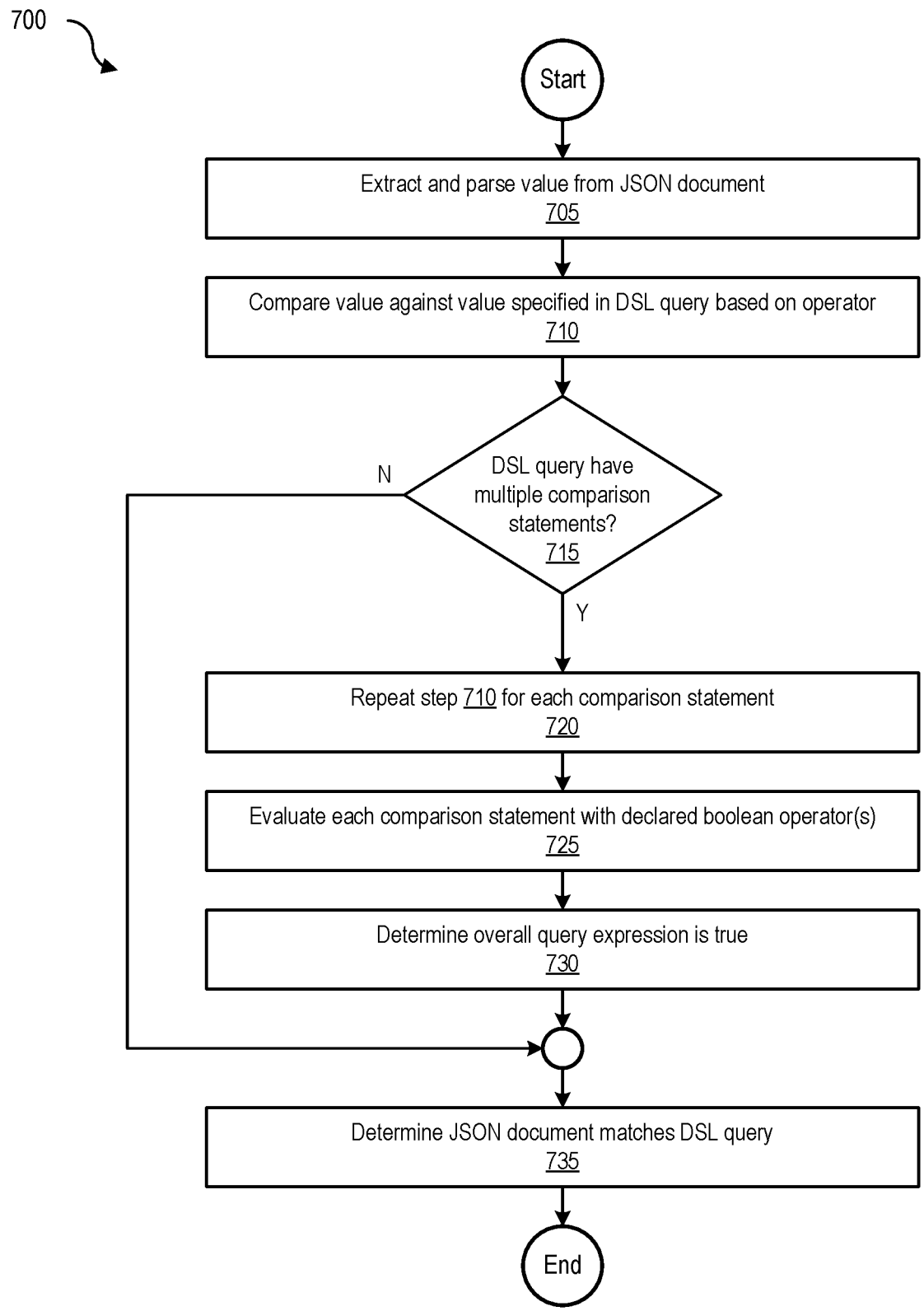
FIG. 7 is a flowchart 700 of a process to determine whether a JSON document matches a DSL query, according to one embodiment of the present disclosure.

FIG. 7 is a flowchart 700 of a process to determine whether a JSON document matches a DSL query, according to one embodiment. The process begins at 705 by extracting and parsing a value from a JSON document (or any structured or semi-structured document). At 710, the process compares the value against a value specified in the DSL query (e.g., based on an operator specified in the DSL query). At 715, the process determines whether the DSL query has multiple comparison statements. If the DSL query does not have multiple comparison statements, the process ends at 735 by determining that the JSON document matches the DSL query. However, if the DSL query has multiple comparison statements, the process at 720 repeats step 710 for each comparison statement (compares an extracted JSON value with a specified DSL query value). At 725, the process evaluates each comparison statement with declared Boolean operators, and at 730, determines that the overall query expression is true. The process ends at 735 by determining that the JSON document matches the DSL query.

In this manner, the methods, systems, and processes disclosed herein distribute and disperse search loads to optimize event processing in cybersecurity computing environments.

Example Computing Environment

Figure 8:
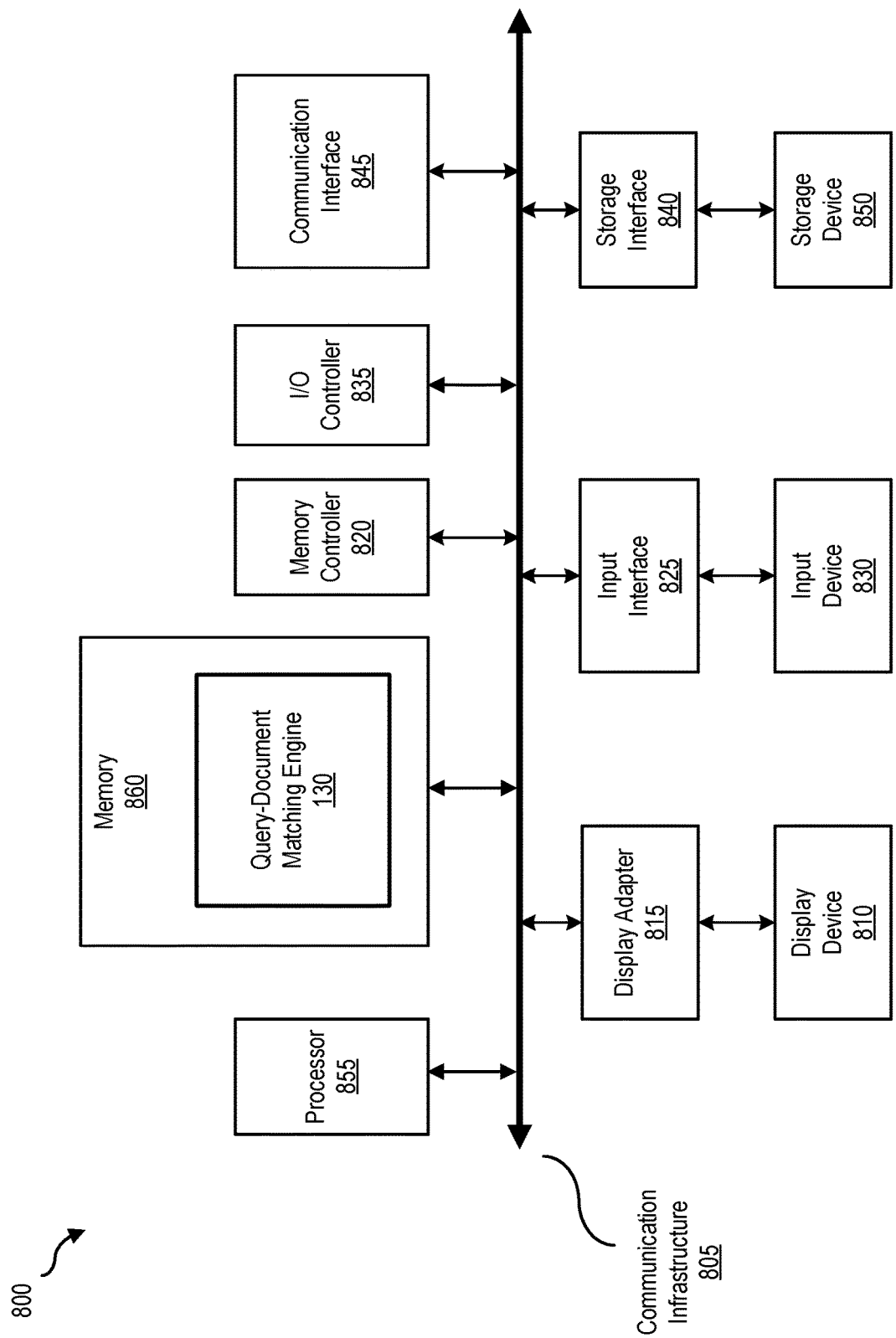
FIG. 8 is a block diagram 800 of a computing system, illustrating a query-document matching engine implemented in software, according to one embodiment of the present disclosure.

FIG. 8 is a block diagram 800 of a computing system, illustrating how a query-document matching engine can be implemented in software, according to one embodiment. Computing system 800 can include security server 115 and broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 855 and a memory 860. By executing the software that executes query-document matching engine 130, computing system 800 becomes a special purpose computing device that is configured to distribute and disperse search loads to optimize security event processing in cybersecurity computing environments.

Processor 855 generally represents any type or form of processing unit capable of processing data or interpreting and executing instructions. In certain embodiments, processor 855 may receive instructions from a software application or module that may cause processor 855 to perform the functions of one or more of the embodiments described and/or illustrated herein. For example, processor 855 may perform and/or be a means for performing all or some of the operations described herein. Processor 855 may also perform and/or be a means for performing any other operations, methods, or processes described and/or illustrated herein. Memory 860 generally represents any type or form of volatile or non-volatile storage devices or mediums capable of storing data and/or other computer-readable instructions. Examples include, without limitation, random access memory (RAM), read only memory (ROM), flash memory, or any other suitable memory device. In certain embodiments computing system 800 may include both a volatile memory unit and a non-volatile storage device. In one example, program instructions implementing query-document matching engine 130 may be loaded into memory 860.

In certain embodiments, computing system 800 may also include one or more components or elements in addition to processor 855 and/or memory 860. For example, as illustrated in FIG. 8, computing system 800 may include a memory controller 820, an Input/Output (I/O) controller 835, and a communication interface 845, each of which may be interconnected via a communication infrastructure 805. Communication infrastructure 805 generally represents any type or form of infrastructure capable of facilitating communication between one or more components of a computing device. Examples of communication infrastructure 805 include, without limitation, a communication bus (such as an Industry Standard Architecture (ISA), Peripheral Component Interconnect (PCI), PCI express (PCIe), or similar bus) and a network.

Memory controller 820 generally represents any type/form of device capable of handling memory or data or controlling communication between one or more components of computing system 800. In certain embodiments memory controller 820 may control communication between processor 855, memory 860, and I/O controller 835 via communication infrastructure 805, and may perform and/or be a means for performing, either alone or in combination with other elements, one or more of the operations or features described and/or illustrated herein. I/O controller 835 generally represents any type or form of module capable of coordinating and/or controlling the input and output functions of a computing device. For example, in certain embodiments I/O controller 835 may control or facilitate transfer of data between one or more elements of computing system 800, such as processor 855, memory 860, communication interface 845, display adapter 815, input interface 825, and storage interface 840.

Communication interface 845 broadly represents any type/form of communication device/adapter capable of facilitating communication between computing system 800 and other devices and may facilitate communication between computing system 800 and a private or public network. Examples of communication interface 845 include, a wired network interface (e.g., network interface card), a wireless network interface (e.g., a wireless network interface card), a modem, and any other suitable interface. Communication interface 845 may provide a direct connection to a remote server via a direct link to a network, such as the Internet, and may also indirectly provide such a connection through, for example, a local area network. Communication interface 845 may also represent a host adapter configured to facilitate communication between computing system 800 and additional network/storage devices via an external bus. Examples of host adapters include, Small Computer System Interface (SCSI) host adapters, Universal Serial Bus (USB) host adapters, Serial Advanced Technology Attachment (SATA), Serial Attached SCSI (SAS), Fibre Channel interface adapters, Ethernet adapters, etc.

Computing system 800 may also include at least one display device 810 coupled to communication infrastructure 805 via a display adapter 815 that generally represents any type or form of device capable of visually displaying information forwarded by display adapter 815. Display adapter 815 generally represents any type or form of device configured to forward graphics, text, and other data from communication infrastructure 805 (or from a frame buffer, as known in the art) for display on display device 810. Computing system 800 may also include at least one input device 830 coupled to communication infrastructure 805 via an input interface 825. Input device 830 generally represents any type or form of input device capable of providing input, either computer or human generated, to computing system 800. Examples of input device 830 include a keyboard, a pointing device, a speech recognition device, or any other input device.

Computing system 800 may also include storage device 850 coupled to communication infrastructure 805 via a storage interface 840. Storage device 850 generally represents any type or form of storage devices or mediums capable of storing data and/or other computer-readable instructions. For example, storage device 850 may include a magnetic disk drive (e.g., a so-called hard drive), a floppy disk drive, a magnetic tape drive, an optical disk drive, a flash drive, or the like. Storage interface 840 generally represents any type or form of interface or device for transmitting data between storage device 850, and other components of computing system 800. Storage device 850 may be configured to read from and/or write to a removable storage unit configured to store computer software, data, or other computer-readable information. Examples of suitable removable storage units include a floppy disk, a magnetic tape, an optical disk, a flash memory device, or the like. Storage device 850 may also include other similar structures or devices for allowing computer software, data, or other computer-readable instructions to be loaded into computing system 800. For example, storage device 850 may be configured to read and write software, data, or other computer-readable information. Storage device 850 may also be a part of computing system 800 or may be separate devices accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8. Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in memory 860, and/or various portions of storage device 850. When executed by processor 855, a computer program loaded into computing system 800 may cause processor 855 to perform and/or be a means for performing the functions of one or more of the embodiments described/illustrated herein. Alternatively, one or more of the embodiments described and/or illustrated herein may be implemented in firmware and/or hardware.

Example Networking Environment

Figure 9:
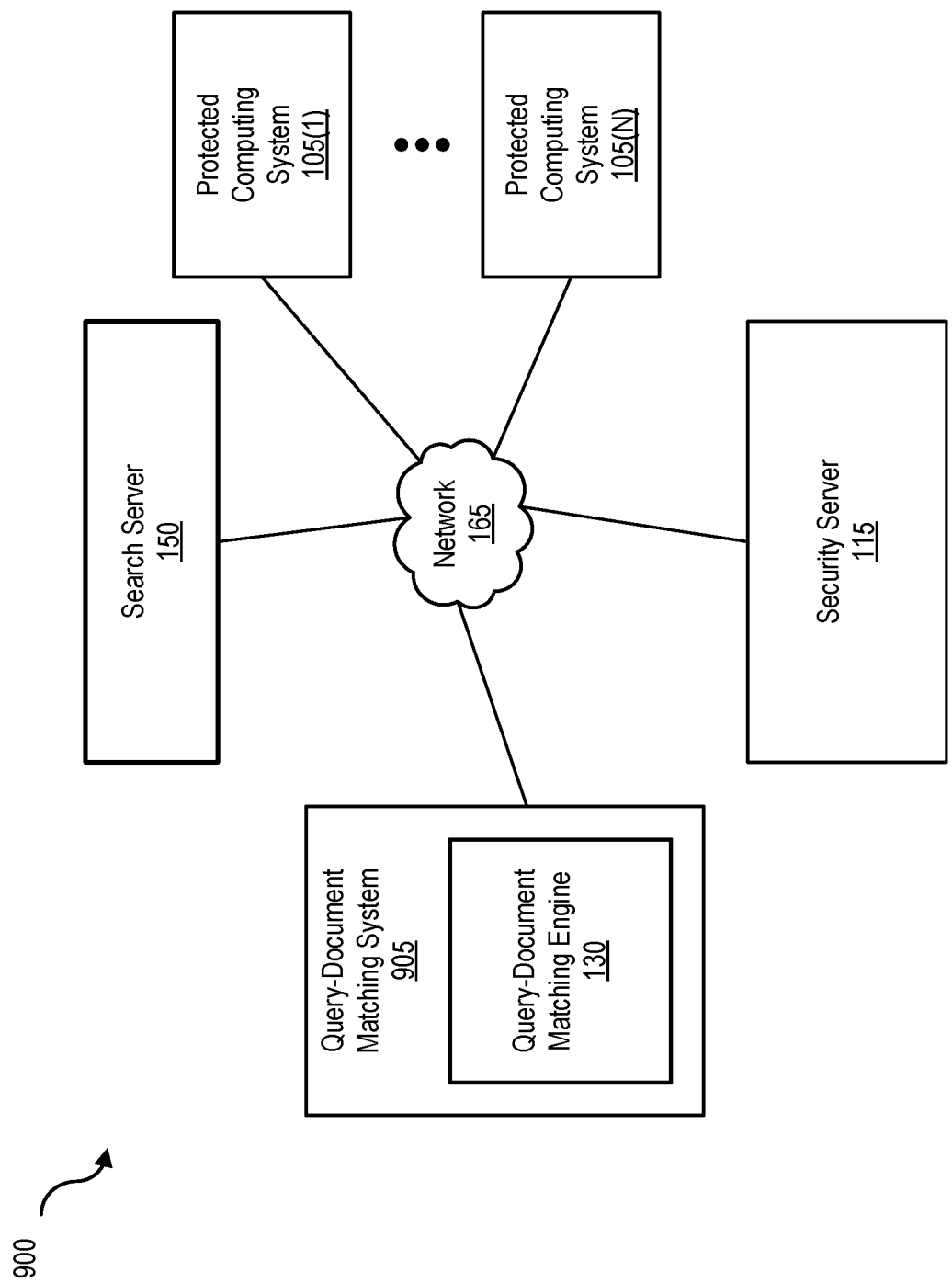
FIG. 9 is a block diagram 900 of a networked system, illustrating how various devices can communicate via a network, according to one embodiment of the present disclosure.

FIG. 9 is a block diagram of a networked system, illustrating how various computing devices can communicate via a network, according to one embodiment. Network 165 generally represents any type or form of computer network or architecture capable of facilitating communication between protected computing devices 105(1)-(N), security server 115, search server 150, and/or query-document matching system 905. For example, network 165 can be a Wide Area Network (WAN) (e.g., the Internet) or a Local Area Network (LAN). In certain embodiments, a communication interface, such as communication interface 845 in FIG. 8, may be used to provide connectivity between protected computing devices 105(1)-(N), security server 115, search server 150, and/or query-document matching system 905, and network 165.

Query-document matching engine 130 may be part of security server 115, or may be separate. If separate, query-document matching system 905 and security server 115 may be communicatively coupled via network 165. All or a portion of embodiments may be encoded as a computer program and loaded onto and executed by query-document matching system 905 and/or security server 115, and may be stored on query-document matching system 905 and/or security server 115, and distributed over network 165.

In some examples, all or a portion of query-document matching system 905 and/or security server 115 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. The embodiments described and/or illustrated herein are not limited to the Internet or any particular network-based environment.

Various functions described herein may be provided through a remote desktop environment or any other cloud-based computing environment. In addition, one or more of the components described herein may transform data, physical devices, and/or representations of physical devices from one form to another. For example, query-document matching engine 130 may transform the behavior of query-document matching system 905 and/or security server 115 to distribute and disperse search loads to optimize security event processing in cybersecurity computing environments.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A computer-implemented method performed by a security server, comprising:
    creating structured or semi-structured documents upon occurrences of security events, wherein the structured or semi-structured documents are stored in a document store and at least some of the structured or semi-structured documents are stored locally at the security server in a document index;
    storing a mapping file that maps search fields used in domain specific language (DSL) queries recognized by a distributed search cluster to keys in the structured or semi-structured documents;
    intercepting a search request comprising a DSL query directed to the distributed search cluster;
    determining that a structured or semi-structured document in the document index matches the DSL query in the search request; and
    in response to the determination of the matching:
        inhibiting an event processing application executing on the security server from forwarding the search request to the distributed search cluster; and
        answering the search request at the security server using the structured or semi-structured document in the document index, without using the distributed search cluster or the document store.

2. The computer-implemented method of claim 1, further comprising:
    receiving an input identifying one or more security events applicable to a task to be performed by execution of the search request comprising the DSL query.

3. The computer-implemented method of claim 2, wherein
    the DSL query comprises one or more comparison statements, and
    each comparison statement of the one or more comparison statements comprises a search field, a comparison operator, and one or more values.

4. The computer-implemented method of claim 3, further comprising:
    maintaining a metadata file that includes a list of the search fields and corresponding data types.

5. The computer-implemented method of claim 4, wherein
    the mapping file indicates one or more keys in the structured or semi-structured document mapped to one or more search fields in the DSL query, and
    the one or more values represent the one or more keys in the structured or semi-structured document.

6. The computer-implemented method of claim 5, further comprising:
    parsing the DSL query into the one or more comparison statements; and
    for each comparison statement;
        accessing the mapping file;
        identifying a key of the one or more keys in the structured or semi-structured document utilizing a search field of the one or more search fields;
        parsing the structured or semi-structured document;
        extracting an associated value of the key utilizing the key in the structured or semi-structured document; and
        parsing the value or converting the value to an expected data type indicated in the metadata file.

7. The computer-implemented method of claim 6, further comprising:
   comparing the associated value with a value specified in the DSL query; and
   determining whether the structured or semi-structured document matches the DSL query.

8. The computer-implemented method of claim 7, further comprising:
   determining whether the DSL query comprises a plurality of comparison statements; and
   repeating the comparing for each comparison statement of the plurality of comparison statements if the DSL query comprises the plurality of comparison statements.

9. The computer-implemented method of claim 1, wherein
   the search request comprises a hypertext transfer protocol (HTTP) request,
   the distributed search cluster is implemented by a search server,
   the structured or semi-structured document is a JavaScript Object Notation (JSON) document, and
   the JSON document represents a security event that identifies a security vulnerability associated with a computing device communicatively coupled to the security server.

10. A non-transitory computer readable storage medium comprising program instructions executable by one or more processors of a security server to:
    create structured or semi-structured documents upon occurrences of security events, wherein the structured or semi-structured documents are stored in a document store and at least some of the structured or semi-structured documents are stored locally at the security server in a document index;
    store a mapping file that maps search fields used in domain specific language (DSL) queries recognized by a distributed search cluster to keys in the structured or semi-structured documents;
    intercept a search request comprising a DSL query directed to the distributed search cluster;
    determine that a structured or semi-structured document in the document index matches the DSL query in the search request; and
    in response to the determination of the matching:
      inhibit an event processing application executing on the security server from forwarding the search request to the distributed search cluster; and
      answer the search request at the security server using the structured or semi-structured document in the document index, without using the distributed search cluster or the document store.

11. The non-transitory computer readable storage medium of claim 10, wherein the program instructions are executable to:
    receive an input identifying one or more security events applicable to a task to be performed by execution of the search request comprising the DSL query.

12. The non-transitory computer readable storage medium of claim 11, wherein
    the DSL query comprises one or more comparison statements, and
    each comparison statement of the one or more comparison statements comprises a search field, a comparison operator, and one or more values.

13. The non-transitory computer readable storage medium of claim 12, wherein
    the mapping file indicates one or more keys in the structured or semi-structured document mapped to one or more search fields in the DSL query, and
    the one or more values represent the one or more keys in the structured or semi-structured document.

14. The non-transitory computer readable storage medium of claim 13, wherein the program instructions are executable to:
    parse the DSL query into the one or more comparison statements;
    for each comparison statement;
      access the mapping file;
      identify a key of the one or more keys in the structured or semi-structured document utilizing a search field of the one or more search fields;
      parse the structured or semi-structured document;
      extract an associated value of the key utilizing the key in the structured or semi-structured document; and
      parse the value or converting the value to an expected data type indicated in the metadata file;
    compare the associated value with a value specified in the DSL query;
    determine whether the structured or semi-structured document matches the DSL query;
    determine whether the DSL query comprises a plurality of comparison statements; and
    repeat the comparing for each comparison statement of the plurality of comparison statements if the DSL query comprises the plurality of comparison statements.

15. The non-transitory computer readable storage medium of claim 10, wherein
    the search request comprises a hypertext transfer protocol (HTTP) request,
    the distributed search cluster is implemented by a search server,
    the structured or semi-structured document is a JavaScript Object Notation (JSON) document, and
    the JSON document represents a security event that identifies a security vulnerability associated with a computing device communicatively coupled to the security server.

16. A system comprising:
    one or more processors of a security server; and
    a memory coupled to the one or more processors, wherein the memory stores program instructions executable by the one or more processors to cause the security server to:
    create structured or semi-structured documents upon occurrences of security events, wherein the structured or semi-structured documents are stored in a document store and at least some of the structured or semi-structured documents are stored locally at the security server in a document index;
    store a mapping file that maps search fields used in domain specific language (DSL) queries recognized by a distributed search cluster to keys in the structured or semi-structured documents;
    intercept a search request comprising a DSL query directed to the distributed search cluster;

determine that a structured or semi-structured document in the document index matches the DSL query in the search request; and in response to the determination of the matching:
inhibit an event processing application executing on the security server from forwarding the search request to the distributed search cluster; and answer the search request at the security server using the structured or semi-structured document in the document index, without using the distributed search cluster or the document store.

17. The system of claim 16, wherein the DSL query comprises one or more comparison statements, and each comparison statement of the one or more comparison statements comprises a search field, a comparison operator, and one or more values.

18. The system of claim 17, wherein the mapping file indicates one or more keys in the structured or semi-structured document mapped to one or more search fields in the DSL query, and the one or more values represent the one or more keys in the structured or semi-structured document.

19. The system of claim 18, wherein the program instructions are executable to:

parse the DSL query into the one or more comparison statements;

for each comparison statement,
access the mapping file;
identify a key of the one or more keys in the structured or semi-structured document utilizing a search field of the one or more search fields;
parse the structured or semi-structured document;
extract an associated value of the key utilizing the key in the structured or semi-structured document; and
parse the value or converting the value to an expected data type indicated in the metadata file;

compare the associated value with a value specified in the DSL query;

determine whether the structured or semi-structured document matches the DSL query;

determine whether the DSL query comprises a plurality of comparison statements; and repeat the comparing for each comparison statement of the plurality of comparison statements if the DSL query comprises the plurality of comparison statements.

20. The system of claim 16, wherein the search request comprises a hypertext transfer protocol (HTTP) request, the distributed search cluster is implemented by a search server, the structured or semi-structured document is a JavaScript Object Notation (JSON) document, and the JSON document represents a security event that identifies a security vulnerability associated with a computing device communicatively coupled to the security server.

* * * * *